United States Patent

[11] 3,598,141

[72] Inventors Shinkichi Yano
131-1, Sakurazaka Dori, 7-chome, Toyonaka-shi, Osaka-fu;
Fujio Kawakatu, Osaka-shi, both of, Japan
[21] Appl. No. 824,233
[22] Filed May 13, 1969
[45] Patented Aug. 10, 1971
[73] Assignee said Shinkichi, by said Kawakatu
[32] Priority Aug. 20, 1968, Sept. 2, 1968, Sept. 14, 1968
[33] Japan
[31] 43/59694, 43/63183 and 43/79733

[54] CUTTER MEANS FOR USE WITH TOOL FOR TAPPING ALREADY LAID WATER-SERVICE PIPES AND THE LIKE WITHOUT INTERRUPTION OF WATER FLOWING THERETHROUGH
4 Claims, 6 Drawing Figs.

[52] U.S. Cl. .................................................. 137/318, 408/72, 408/204, 408/208
[51] Int. Cl. ........................................................ B23b 41/08
[50] Field of Search ............................................ 77/42, 37—41, 69

[56] References Cited
UNITED STATES PATENTS
1,045,289  11/1912  Hill ............................. 77/38

*Primary Examiner*—Francis S. Husar
*Attorney*—Hall & Houghton

ABSTRACT: A device wherein a split T-pipe having a water-distributing pipe is joined to an already laid large-diameter water-service pipe at a portion thereof and a cylindrical cutter covered with a cover sleeve is inserted in said water-distributing pipe, thereby boring a required hole in the Water-service pipe at a part thereof, said covering sleeve stopping gaps between tooth edges at the front-end periphery of the cylindrical body to prevent chips from being discharged into the outside through the gaps between said tooth edges. Other advantages and details of the arrangement will be made clear.

3,598,141

CUTTER MEANS FOR USE WITH TOOL FOR TAPPING ALREADY LAID WATER-SERVICE PIPES AND THE LIKE WITHOUT INTERRUPTION OF WATER FLOWING THERETHROUGH

BACKGROUND OF THE INVENTION

1. Field of the Invention

The present invention relates to a cutter means for use with a tool for tapping an already laid large-diameter water-service pipe at a part thereof without the interruption of water flowing therethrough, in order to connect a branch pipe T-wise to the water-service pipe.

2. Description of the Prior Art

The known cutter means of this type for water-flow-uninterrupted tapping or boring devices is of such a design that tooth edges are incised around the front-end periphery of a cylindrical metal body of the same diameter as a hole to be made and the boring is effected by rotating the cutter while pressing the cutter tooth edges of the cutter against the lateral surface of the water-service pipe. In this case, if the water-service pipe to be bored is a cast iron pipe, the chips scatter in fine powder. The moment the boring or tapping is completed, the chips are mixed with the flowing water in the branch pipe and are thereby carried away, but there is no trouble in this case, since the chips are in the from of fine powder.

Recently, however, synthetic resin pipes and ductile cast iron pipes have come into use for water-service pipes. If the conventional cutter is used for boring such synthetic resin or ductile cast iron pipes, the tenacity which is a property of synthetic resin and ductile cast iron pipes causes the chip to take the form of a narrow, spiral, continuous strip of the same width as that of the tooth edge rather than the form of fine powder, and such strips tend to remain in the cutter. It often happens, however, that such narrow spiral strips, which would cause no serious trouble if they continued to remain in the cutter, i.e. in the metal cylindrical body, come out of the cutter from between the rotating cutter tooth edges into a space between a branch water-service pipe and the cutter. As the strips of chips come out of the cutter, in the case where the cutter is withdrawn after the boring is completed, the striplike chips remain in a branch water-service pipe (FIG. 6) and are carried away together with the water. The chips are then caught by a valve, a meter, etc. connected with the water-service pipe and hinder their proper functions. For this reason the water-flow-uninterrupted boring machine is currently considered unusable for boring synthetic resin or ductile cast iron water-service pipes.

SUMMARY OF THE INVENTION

The present invention provides an improved cutter means for use with water-flow-uninterrupted boring devices characterized in that a cover sleeve is fitted on a cutter, said cover sleeve stopping gaps between tooth edges to prevent the chips in the form of spiral strips from remaining in a branch water-service pipe.

BRIEF DESCRIPTION OF THE DRAWINGS

In the accompanying drawings showing a preferred embodiment of the invention.

DESCRIPTION OF THE PREFERRED EMBODIMENT

In a preferred embodiment of a cutter means for use with water-flow-uninterrupted boring devices shown in FIGS. 1 through 6, the new inventive combination comprises an already laid water-distributing water-service pipe A, a split T-pipe B clamped headband-wise around said water-service pipe at a part thereof, and a cutter C which is cylindrical, has a plurality of saw-toothlike edges at the front end and is moved while being rotated within the branch of the split T-pipe by a suitable outside power source.

The arrangement of the new combination according to the present invention will now be described with reference to the drawings.

The water-service pipe A may be a cast iron pipe, but a greater merit will be obtained if the invention is applied to pipes of high tenacity such as synthetic resin and ductile cast iron pipes. The split T-pipe B is of a two-piece or three-piece construction, one of the pieces being provided with a branch pipe 20. The split T-pipe B is secured headband-wise to a part of the water-service pipe B by means of clamping metal fixtures 21.

Figure 3:
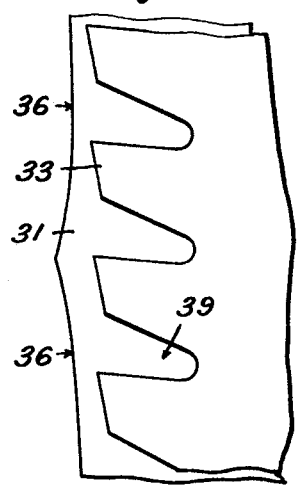
FIG. 3 is an enlarged development showing the relation between cutter tooth edges and cover sleeve.
Figure 2:
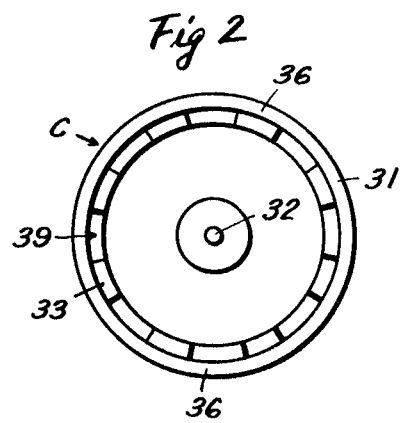
FIG. 2 is a left-hand end view.
Figure 5:
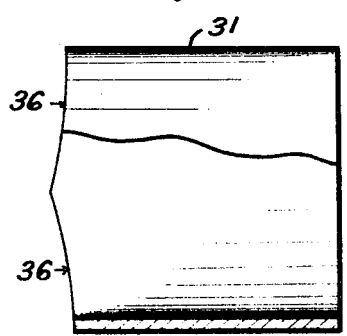
FIG. 5 is a plan view thereof.
Figure 4:
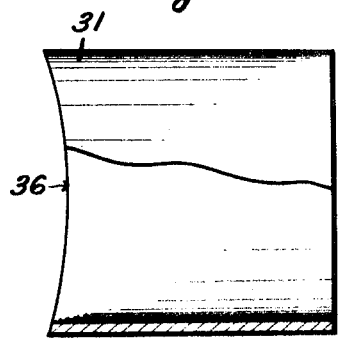
FIG. 4 is a front view of the cover sleeve, the lower half being shown in section.

The cutter C consists of a hollow cylindrical body 30, a cover sleeve 31 and a center drill 32. A plurality of saw-toothlike tooth edges 33 as shown in FIG. 3 are provided at the front-end periphery of the cylindrical body. The cover sleeve 31 is fitted on the cylindrical body 30 so as to snugly but movably embrace the same and is forwardly urged by a resilient means shown as a spring 35 inserted between an abutment means shown as a split ring 34 projecting from the outer surface of the cutter body 30 and the rearward end of the cover sleeve 31. The front end of the cylindrical body 30 in the form shown has a contour shaped to matingly fit against the outer surface of the service pipe A, herein such contour being concavely curved on opposite sides of a diameter of the sleeve as at 36, 36 with center at the central part so that it may just fit with arcs of the outer surface of the water-service pipe A to be bored which in the form shown extends at right angles to the axis of the T-pipe 20. The center drill 32 has its base portion fixed in a central hole 37 in the cylindrical body 30 by means of a setscrew 38.

Figure 1:
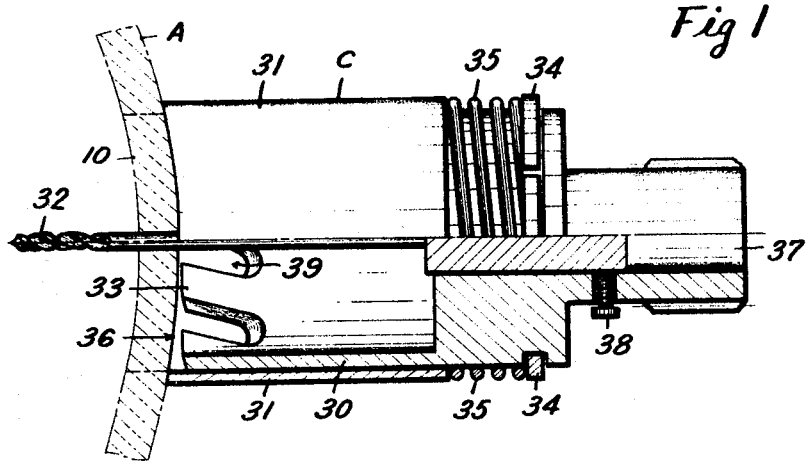
FIG. 1 is a front view of a cutter means according to the invention, the lower half being shown in section.
Figure 6:
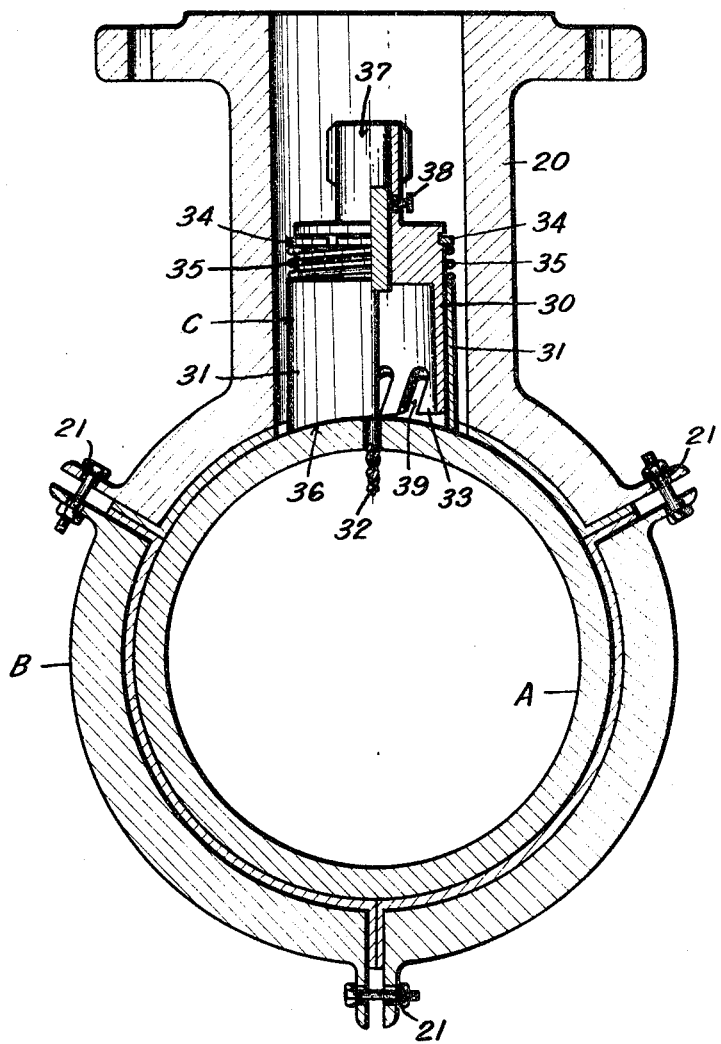
FIG. 6 is a longitudinal section of a split T-pipe, a branch pipe and a water-service pipe being subjected to water-flow-uninterrupted boring work by the use of the cutter means of the present invention.

FIGS. 1 and 6 shows a condition in which within the water-distributing pipe 20 the drill 32 is screwed into the water-service pipe A to be bored. The cover sleeve 31 is urged against the surface of the water-service pipe A by the force of the spring 35. If the cutter C is rotated in this condition while being pressed by any suitable method, its tooth edges 36 cut and bore the lateral surface of the water-service pipe A. In this case, the cylindrical body 30 rotates, but the cover sleeve 31 does not rotate, since the concave curves 36, 36 at the front end thereof are engaged with arcs of the outer surface of the water-service pipe A. As a result, gaps 39 between the tooth edges 33 are always completely stopped by the cover sleeve. The cylindrical body 30 moves forwardly as its tooth edges 33 cut the wall of the water-service pipe A, but the cover sleeve 31 remains pressed against the outer surface of the water-service pipe A. A split ring 34 on the outer surface of the cylindrical body certainly moves forwardly together with the cylindrical body 30 while compressing the spring 35. As the outer surface of the water-service pipe A is cut out in circular form by the cylindrical body in the manner described above, the boring is thus completed, with a circular plate 10 left at the site of the boring.

When the cutter C is pulled out of the branch pipe 20 upon completion of the boring, the circular plate 10 at the site of the boring is taken out together with the center drill 33. Therefore, the circular plate 10 performs the function of a lid for the hollow space of the cylindrical body 30. Therefore, the chips left in the hollow space are completely taken out together with the cutter C without being scattered into the outside.

In addition, since a water-stop pipe, though not shown in the drawings, is connected to the branch pipe 20, even if the cutter C is withdrawn, the water flowing in the water-distributing water-service pipe A only fills the branch pipe, not flowing out of the piping. After a new water-service pipe is connected to the water-stop pipe, the stopcock of the water-stop pipe is opened from the outside to allow the water to branch off.

While there have been described herein what are at present considered preferred embodiments of the several features of the invention, it will be obvious to those skilled in the art that modifications and changes may be made without departing from the essence of the invention. It is therefore to be understood that the exemplary embodiments thereof are illustrative and not restrictive of the invention, the scope of which is defined in the appended claims and that all modifications that come within the meaning and range of equivalency of the claims are intended to be included therein.

I claim:

1. A cutter assembly particularly adapted for tapping an already laid water-service pipe, without interrupting the flow of water therethrough, after a split T-pipe of a given internal diameter for connection to a water-distributing pipe has been attached to said service pipe, said cutter assembly comprising, in combination:
   a. a hollow cylindrical cutter body (30) having cutting teeth at its forward end,
   b. a center drill (32) carried by said cylindrical cutter body and extending beyond the toothed forward end thereof,
   c. a cylindrical cover sleeve (31) snugly but movably embracing said cylindrical body (30), and
   d. resilient means bearing against said cover sleeve for urging said cover sleeve forwardly against said service pipe during the cutting operation,
   e. said cylindrical cover sleeve (31) being of an external size smaller than the internal size of said T-pipe so that said assembly may be entered into and withdrawn from said T-pipe as a unit.

2. A cutter assembly as claimed in claim 1, wherein:
   f. said cutter body is provided with split ring means (34) projecting from its outer surface in spaced relation to the rearward end of said cover sleeve, and
   g. said resilient means (d) comprises a coil spring (35) embracing said cutter body between said split ring means and the rearward end of said cover sleeve.

3. A cutter assembly as claimed in claim 1, wherein:
   f. said cylindrical cover sleeve (31) has the contour of its forward edge shaped to matingly fit against the outer surface of a cylindrical water-service pipe.

4. A cutter assembly as claimed in claim 3, wherein the contour of said forward edge is concavely curved at opposite sides of a diameter of said sleeve to fit against the outer surface of a cylindrical water-service pipe extending at right angles to the axis of said T-pipe.